United States Patent [19]

Miller et al.

[11] Patent Number: 4,922,573
[45] Date of Patent: May 8, 1990

[54] COMPRESSION FITTED BUSHING INSTALLATION

[75] Inventors: John M. Miller, Huntington Station; Richard O. Barton, Levittown, both of N.Y.

[73] Assignee: Grumman Aerospace Corporation, Bethpage, N.Y.

[21] Appl. No.: 338,008

[22] Filed: Apr. 14, 1989

[51] Int. Cl.$^5$ .............................................. F16L 5/02
[52] U.S. Cl. ........................................ 16/2; 411/82; 411/258; 411/512; 156/92; 408/241 B; 174/152 R
[58] Field of Search ............... 411/512, 908, 909, 914, 411/82, 258, 178; 16/2; 156/91, 92; 248/56; 52/705, 707; 408/241 B; 174/65 G, 152 G, 152 R, 153 R, 76, 77 R

[56] References Cited

U.S. PATENT DOCUMENTS

| | | |
|---|---|---|
| 2,088,358 | 7/1937 | Adams . |
| 2,399,526 | 4/1946 | Warren, Jr. . |
| 2,718,485 | 9/1955 | Samuely .................. 156/91 |
| 3,022,197 | 2/1962 | Jedlicka . |
| 3,022,685 | 2/1962 | Armacost ............... 408/241 B |
| 3,061,455 | 10/1962 | Anthony . |
| 3,179,143 | 4/1965 | Schultz et al. ................ 411/82 |
| 3,305,996 | 2/1967 | Shapiro ........................ 16/2 |
| 3,322,001 | 5/1967 | Mele ............................ 16/2 |
| 3,327,776 | 6/1967 | Butt . |
| 3,989,099 | 11/1976 | Hosono et al. . |
| 4,009,417 | 2/1977 | Waldon et al. . |
| 4,019,098 | 4/1977 | McCready et al. . |
| 4,118,756 | 10/1978 | Nelson et al. . |
| 4,322,737 | 3/1982 | Sliwa, Jr. . |
| 4,414,604 | 11/1983 | Matsui et al. . |
| 4,503,906 | 3/1985 | Andres et al. . |
| 4,550,774 | 11/1985 | Andres et al. . |
| 4,729,705 | 3/1988 | Higgins .................. 411/82 |
| 4,776,738 | 10/1988 | Winston .................. 411/82 |

OTHER PUBLICATIONS

Dombrowskas, R. J., et al., "Conduction Cooled Heat Plate for Modular Circuit Package," IBM Technical Disclosure Bulletin, vol. 13, No. 2, Jul. 1970.

Primary Examiner—Nicholas P. Godici
Assistant Examiner—Edward A. Brown
Attorney, Agent, or Firm—Pollock, VandeSande & Priddy

[57] ABSTRACT

Bushings are embedded within a production drill plate to replicate the hole pattern of a master hole pattern plate. The exterior surface of each bushing is threaded, as is the wall of a receiving hole in the production drill plate. The pitch of the bushing and hole are the same but the pitch diameters are somewhat different so that the threads of the bushing are loosely engaged within the threads of the hole. When the bushing is potted in a properly aligned position, the containment potting material becomes compressed in the thread engagement area thereby resisting axial displacement of the bushing.

4 Claims, 2 Drawing Sheets

PRIOR ART

COMPRESSION FITTED BUSHING INSTALLATION

FIELD OF THE INVENTION

The present invention relates to the fabrication of bushings, and more particularly to a bushing adapted for compression fitting within a plate.

BACKGROUND OF THE INVENTION

Bushings are often installed in a particular pattern within a plate for guiding tool bits into a work piece in the required pattern. In production methods, it is necessary from time to time to replace the installed bushings as a result of normal wear and tear. This is most efficiently done by recreating the pattern of bushings within a production drill plate from a master hole pattern plate. In order to do this, the production plate is placed upon the master plate; and the pattern of holes in the master plate is replicated in the production plate.

If the production plate is to include a large number of bushings, it would be difficult to accurately transfer aligned holes from the master plate if one were to simply drill through each hole of the master plate and production plate. Accordingly, in the past the bushing holes of the production plate have been drilled oversize relative to the outer diameter of the bushing. An alignment pin is then pushed through a hole in the master plate and made to pass through the interior bore of an installed production plate bushing to ensure alignment of the bushing bore with the respective hole in the master plate through which the alignment pin passes. The oversize hole provides some tolerance to achieve good alignment therebetween.

In order to secure the bushing within the production plate, castable material such as epoxy has been used between the exterior surface of the bushing and the wall of the bushing-receiving hole. Typically, the exterior surface of the bushing is knurled so as to maximize the interface surface area between the bushing and castable material.

This procedure for forming the production drill plate suffers a major disadvantage in that the bushing is limited in the load it can assume from an inserted tool to the extent of the shear strength of the castable material. This is due to the fact that the outer diameter of the bushing is less than the diameter of its receiving hole in the production plate and the gap therebetween is filled with the castable material When axial loads exceed the shear strength of the castable material, the castable material will fail and the bushing will be torn from the production plate.

BRIEF DESCRIPTION OF THE PRESENT INVENTION

The present invention is intended to increase the securement of a bushing within a production plate so that compressive strength exists between a bushing and a receiving hole in a production plate. This is accomplished by forming a spiral or thread on the outside surface of the bushing which is made to be received within a hole in the production plate which is likewise threaded with the same pitch but with a slightly different diameter. In particular, the major diameter of a male bushing thread is to be slightly larger than the minor diameter of the female thread formed in the wall of the production plate hole.

In customary usage of the invention a hole pattern of a master hole pattern plate is replicated with very high precision in multiple production drill plates. A production plate has oversize holes drilled in approximate locations to the master hole pattern and bushings are installed. A close tolerance pin aligns each externally threaded bushing to a corresponding hole in the master plate while castable containment material such as epoxy is applied in the oversized hole, around the outside of each bushing. The master hole pattern plate and close tolerance alignment pin provide exact bushing location during application of castable containment material. The center line of the bushing will, in most cases, not be coaxial with the center line of a respective oversize hole in the production plate. In all cases, the castable material is entrapped in line between the harder material of the external bushing threads and the production plate threads so that when pull-out loads are placed on the bushing, the castable material is placed in compression rather than in shear, as with standard potted bushings of the prior art described. The advantageous result is the increase of resistance necessary to pull out the embedded bushing.

A second embodiment of the invention consists of concentric rings formed in the production plate holes and the bushings, rather than spiral threads, to serve the same purpose. The pitch of concentric rings on a bushing is the same as the ring-shaped grooves in a production plate hole, but the pitch diameters are slightly different, as in the case of the spiral wound embodiment just described. The advantages of placing the castable material in compression would likewise be the same. However, since it would not be possible to thread a bushing into a production plate hole, it would be necessary to have separable plate components having interfacing edges colinear with the diameter of the production plate hole into which a bushing is inserted.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
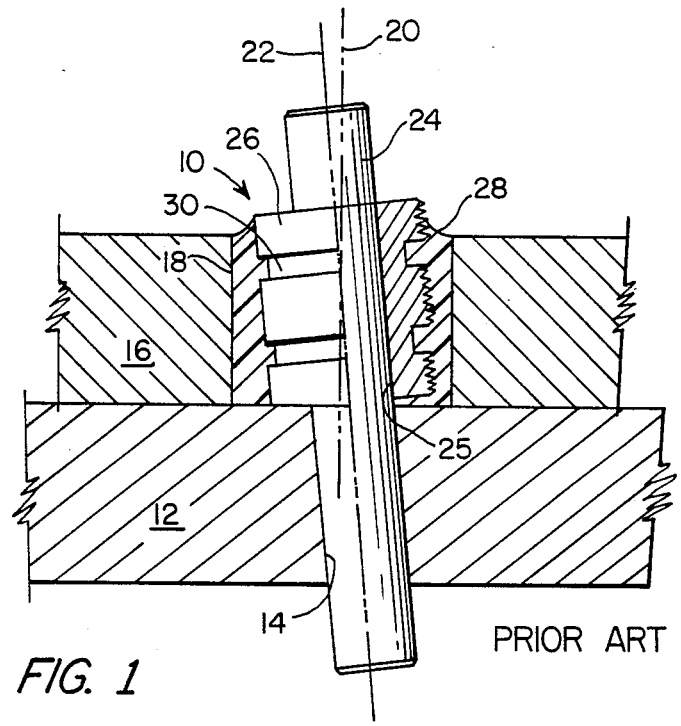
FIG. 1 is a partial cut-away sectional view of a prior art installed bushing illustrating the positioning of a bushing within a production drill plate hole by utilizing an alignment pin.

In FIG. 1 the prior art utilization of an externally knurled bushing 10, embedded within a production drill plate 16, is illustrated. As previously mentioned, the purpose of the present invention is to quickly and efficiently replicate a hole pattern in a production drill plate 16 by using the hole pattern in a master hole pattern plate 12. FIG. 1 illustrates the replication of a single hole 14 in the production drill plate 16, but it is to be understood that the invention is primarily intended to be used in replicating a multi-hole pattern. An oversize hole 18 (relative to hole 14) is drilled with a center line 20 approximating center line 22 of hole 14. The word "approximating" is used advisedly since, realistically, perfection in obtaining coaxial center lines is, in practice, extremely difficult to achieve.

The bushing 10 is inserted within the oversize hole 18 and becomes potted when castable containment material 28 fills the gap between the wall of hole 18 and the outer knurled surface of bushing 10. Typically, such material may be epoxy. Before the material hardens, an alignment pin 24 is passed through both the master hole 14 and the central bore 25 of bushing 10 so that the bore does become coaxially aligned with the master hole 14. Since the bushing is capable of displacement along six axes, prior to the containment material hardening, the coaxial relationship between hole 14 and bore 25 is possible while the alignment pin 24 is passed therethrough. After the containment material is hardened, the alignment pin may be removed thereby resulting in a permanently embedded bushing which maintains its central bore 25 in coaxial alignment with the master hole 14. Drill tools may now be repeatedly passed through the bushing bores to replicate the identical hole pattern in work pieces.

As previously mentioned, the bushing 10 of the prior art is characterized by a knurled exterior surface indicated by reference numeral 26. Recessed annular grooves 30 are transversely formed in the exterior surface of the bushing 10. The combination of knurled and grooved surface produces a certain degree of interlock between the cured castable containment material 28 and the bushing 10. However, as previously stated, the pull-out strength of the bushing is limited by the shear strength of the castable material since the outer diameter of bushing 10 is less than the diameter of hole 18. In other words, the castable material separates the bushing from the wall of hole 18 and represents a limitation in terms of the resistance to push-or-pull forces exerted upon the bushing. Accordingly, in repeated production use of the embedded bushing, a production plate will have limited life requiring frequent replacement as the embedded bushings become displaced from the castable containment material 28.

The purpose of the present invention is to present a bushing-hole configuration which has increased resistance to axial forces exerted on the bushing 10.

Figure 2:
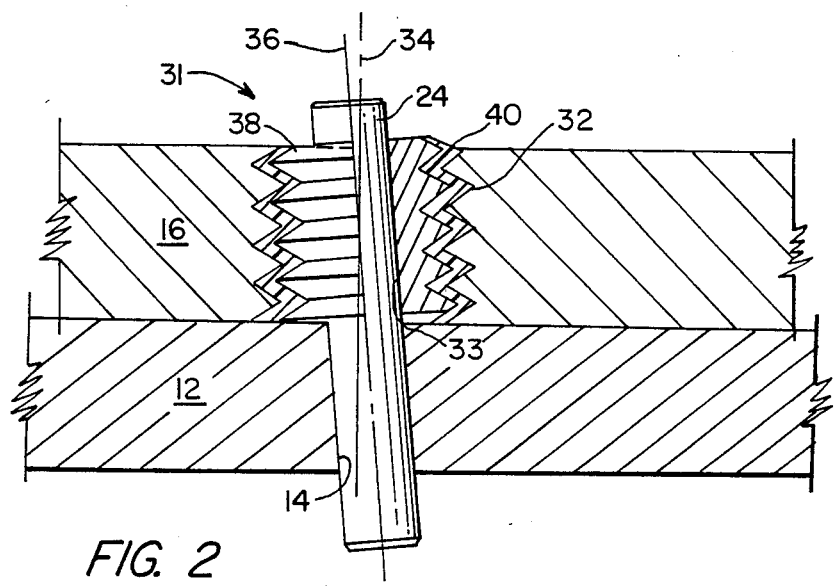
FIG. 2 is a partial cut-away sectional view similar to that of FIG. 1 but illustrating a first embodiment of the bushing configuration of the present invention.

FIG. 2 illustrates the construction of the present invention. Reference numeral 31 generally indicates the present bushing which is seen to mate with a threaded hole 32 in the production drill plate 16. The exterior surface of bushing 31 is threaded with the same pitch as hole 32 but the male thread 38 formed on bushing 31 has a major (outer) diameter which is less than the major (outer) diameter of the female thread of hole 32 but is greater than the minor (inner) diameter of the female thread. As in the case of the prior art embodiment of FIG. 1, castable containment material 40 is deposited in the gap between the threads of the bushing and hole. In order to loosely insert bushing 31 within hole 32, it is only necessary to screw the bushing 31 into the threaded hole 32. The threading action is possible because the pitch of both threads on the bushing and in the hole is the same. However, because the pitch diameter of the bushing is somewhat less than that of the hole, the bushing is still capable of exercising some degree of tolerance along six axes thereby permitting precise alignment of the central bushing bore 33 and the master plate hole 14 by employing an alignment pin 24. With the pin in place, the castable containment material 40 is cured and the pin is removed. This ensures the coaxial alignment of axes 36 and 34 of corresponding bushing bore 33 and hole 14.

Figure 3:
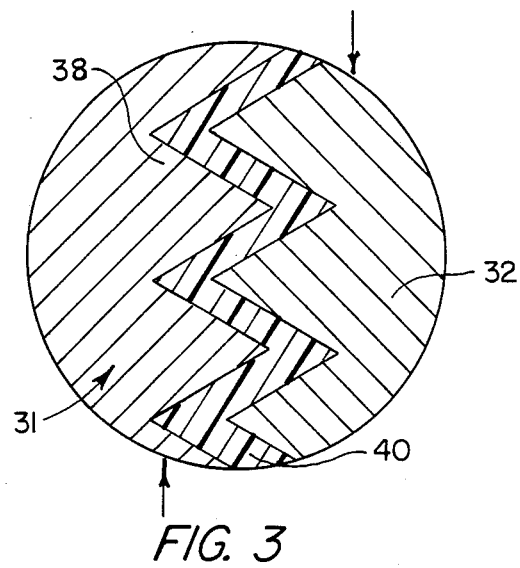
FIG. 3 is an enlarged partial sectional view illustrating the interface between a first embodiment bushing and production plate hole wall.

The improvement of bushing 31 over the prior art bushing 10 (FIG. 1) can be better appreciated by viewing FIG. 3. The confronting vertical arrows in this figure illustrate how the bushing threads 38 and hole threads compress hardened containment material between confronting threads of the bushing and hole when axial forces are exerted on the bushing. Axial movement of the bushing is precluded unless load forces on the bushing exceed the compressive strength of the bushing or plate material. Due to the fact that the compressive strength of the material 40 is several times that of the shear strength, installed bushing 31 will provide superior results from that of the prior art described.

Figure 4:
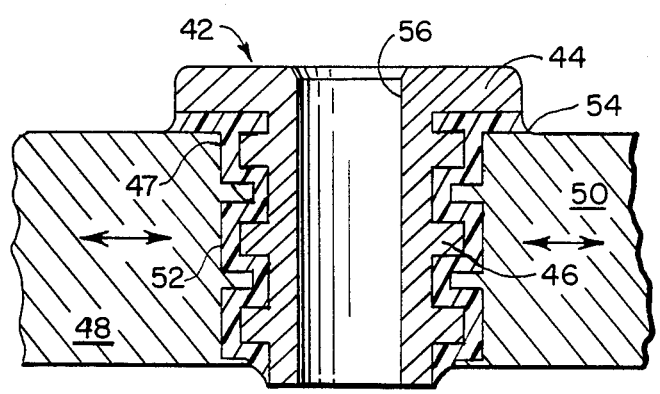
FIG. 4 is a sectional view of a second embodiment of the present invention.

FIGS. 2 and 3 relate to a first embodiment of the present invention, namely, the characterization of the exterior bushing surface and receiving hole with threads. However, FIG. 4 illustrates a second embodiment of the present invention wherein axially spaced and concentric rings 46 are formed on the exterior surface of the bushing 42. In the case of this embodiment, the bushing is illustrated as having an annular shoulder 44 which can also characterize the first embodiment. In lieu of a threaded hole wall, in this embodiment ring-shaped grooves 47 are formed within the hole wall 52. The grooves have the same pitch as the rings 46 on the bushing and the relationship of major and minor diameters for the projecting rings and mating grooves are the same as discussed in connection with the first embodiment of FIGS. 2 and 3. Thus, the containment material 54, which may also be epoxy, is placed in compression when axial loads are exerted upon the bushing. Accordingly, the resistance to axial displacement of the bushing is the same as in connection with the first embodiment.

However, since the bushing cannot be threaded into the hole of a production plate, the production plate must be separated into congruent halves along the center line of a hole into which the bushing is to be received. This is indicated by the matching sections 48 and 50 of the illustrated production plate. The plate halves must be attached after installation of a bushing, by means such as welding or the like. The cross-sectional view through the bushing of FIG. 4 plainly illustrates the axially extending bore 56 through which an alignment pin will pass during embedding of the bushing in the production plate and will thereafter serve as a guide for a tool drill.

It should be understood that the invention is not limited to the exact details of construction shown and described herein for obvious modifications will occur to persons skilled in the art.

We claim:

1. An embedded bushing structure comprising:
    a plate having at least one hole therein, a wall of the hole having concentric and axially spaced grooves formed therein of a predetermined pitch;
    a bushing located within the hole, the bushing having matching concentric and axially spaced projections of the same pitch as the grooves but wherein the major diameter of the projections is less than the major diameter of the grooves and more than the minor axis of the grooves to effect axial overlapping between the grooves and projections while creating a gap therebetween; and cured castable containment material located in the gap for resisting axial displacement of the bushing in response to axial loads as the material undergoes compression.

2. The structure set forth in claim 1 wherein the projections of the bushing and the grooves of the hole wall are helical.

3. The structure set forth in claim 1 wherein the projections of the bushing and the grooves of the hole are ring shaped.

4. The structure set forth in claim 3 wherein the plate is separated into sections along a diametrical line across the hole to permit insertion of the bushing, after which the sections are brought into secured abutment.

* * * * *